(12) United States Patent
Engelen et al.

(10) Patent No.: US 10,869,376 B2
(45) Date of Patent: Dec. 15, 2020

(54) ORCHESTRATING PRODUCTION OF AN EXPERIENCE EFFECT

(71) Applicant: SIGNIFY HOLDING B.V., Eindhoven (NL)

(72) Inventors: Dirk Valentinus René Engelen, Heusden-Zolder (BE); Anthonie Hendrik Bergman, Nuenen (NL); Bartel Marinus Van De Sluis, Eindhoven (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/490,237

(22) PCT Filed: Feb. 27, 2018

(86) PCT No.: PCT/EP2018/054745
§ 371 (c)(1),
(2) Date: Aug. 30, 2019

(87) PCT Pub. No.: WO2018/158217
PCT Pub. Date: Sep. 7, 2018

(65) Prior Publication Data
US 2020/0077496 A1 Mar. 5, 2020

(30) Foreign Application Priority Data
Mar. 2, 2017 (EP) .................................... 17158795

(51) Int. Cl.
*H04W 24/00* (2009.01)
*H04M 1/725* (2006.01)
(Continued)

(52) U.S. Cl.
CPC ............. *H05B 47/19* (2020.01); *G05B 15/02* (2013.01); *H04W 4/023* (2013.01); *H04W 4/12* (2013.01); *H05B 47/105* (2020.01)

(58) Field of Classification Search
None
See application file for complete search history.

(56) References Cited

U.S. PATENT DOCUMENTS

2009/0117850 A1* 5/2009 Jokinen ................. H04M 19/04
455/66.1
2012/0034934 A1 2/2012 Loveland et al.
(Continued)

FOREIGN PATENT DOCUMENTS

WO 0022860 A1 4/2000
WO 2010100576 A1 9/2010
WO 2015049412 A1 4/2015

*Primary Examiner* — Erika A Washington
(74) *Attorney, Agent, or Firm* — Meenakshy Chakravorty (57) ABSTRACT

A system (1, 11, 21) is configured to store an indicator of a first person (51) for which a digital message is intended and an experience effect in a memory of the system. The experience effect is part of or derived from the digital message and the digital message comprises text composed by a second person (52). The system is further configured to determine whether the first person is within a certain range of an electronic device (19, 21) which can be used to produce the experience effect, e.g. a luminaire, and to cause the electronic device to produce the experience effect and cause the text to be reproduced on a text rendering device at the same time upon the first person being determined to be within the certain range of the electronic device.

10 Claims, 6 Drawing Sheets

(51) Int. Cl.
     *H05B 47/19*      (2020.01)
     *H05B 47/105*      (2020.01)
     *G05B 15/02*      (2006.01)
     *H04W 4/02*      (2018.01)
     *H04W 4/12*      (2009.01)

(56) References Cited

U.S. PATENT DOCUMENTS

| | | |
|---|---|---|
| 2014/0132390 A1 | 5/2014 | Loveland et al. |
| 2014/0253666 A1* | 9/2014 | Ramachandran ... H04M 3/4872 |
| | | 348/14.06 |
| 2015/0288822 A1* | 10/2015 | Dyer ................ H04L 67/30 |
| | | 455/413 |
| 2016/0056629 A1 | 2/2016 | Baker et al. |
| 2018/0133900 A1* | 5/2018 | Breazeal ............ G06F 40/117 |
| 2019/0261484 A1 | 8/2019 | Krajnc |

\* cited by examiner

ORCHESTRATING PRODUCTION OF AN EXPERIENCE EFFECT

CROSS-REFERENCE TO PRIOR APPLICATIONS

This application is the U.S. National Phase application under 35 U.S.C. § 371 of International Application No. PCT/EP2018/054745, filed on Feb. 27, 2018, which claims the benefit of European Patent Application No. 17158795.9, filed on Mar. 2, 2017. These applications are hereby incorporated by reference herein.

FIELD OF THE INVENTION

The invention relates to a system for orchestrating production of an experience effect.

The invention further relates to a method of orchestrating production of an experience effect.

The invention also relates to a computer program product enabling a computer system to perform such a method.

BACKGROUND OF THE INVENTION

Nowadays, many people carry personal electronic devices, e.g. smartphones, with them most of the day. This makes it possible to receive digital messages like e-mails, chat messages (e.g. WhatsApp) or social media messages (e.g. Facebook or Twitter) anywhere and anytime. Sometimes, a person may want to delay delivery of his message. For example, when somebody decides to congratulate a friend with her birthday in a special way, he may want to start working on this right away, so it would be nice to compose the message already, and plan for sending it out on a good moment at the birthday. A product called Buffer from a company called Buffer could be used, for example, to schedule social media posts for later delivery.

Digital messages may be enhanced by adding emoticons, images and animations. However, the capabilities of conventional personal electronic devices are limited and in certain situations, e.g. when somebody wants to congratulate a friend with her birthday, a sender or recipient of the digital message might prefer to make a special experience from the receipt of the digital message that goes beyond the display of text, emoticons, images and animations on the personal electronic device.

SUMMARY OF THE INVENTION

It is a first object of the invention to provide a system, which is able to enhance the reproduction of digital messages with experience effects (e.g. light effects).

It is a second object of the invention to provide a method, which enhances the reproduction of digital messages with experience effects (e.g. light effects).

In a first aspect of the invention, the system comprises memory and at least one processor configured to store an indicator of a first person for which a digital message is intended and an experience effect, e.g. a light effect, in said memory, said experience effect being part of or derived from said digital message and said digital message comprising text composed by a second person, to determine whether said first person is within a certain range of an electronic device, which can be used to produce said experience effect e.g. an electronic device comprising a light source, to cause said electronic device to produce said experience effect upon said first person being determined to be within said certain range of said electronic device, and to cause said text to be reproduced on a text rendering device upon said first person being determined to be within said certain range of said electronic device. The experience effect may comprise, for example, an experience script (e.g. a light script). Said text of said digital message may comprise one or more emoticons and may even consist of one or more emoticons without including any words, for example. Said electronic device and said text rendering device may be the same device, for example. Said system may comprise said text rendering device, for example.

The inventors have recognized that the reproduction of digital messages can be enhanced by having an electronic device, e.g. a luminaire, other than the personal electronic device produce experience effects, e.g. light effects. This other electronic device may be specialized in producing such experience effects. Since the person for which the digital message is intended is not always near an electronic device which can produce the desired experience effect(s), the reproduction of the text of the message is postponed until the desired experience effect(s) can be reproduced as well.

Said at least one processor may be configured to receive said digital message, to estimate an emotion of said second person from said digital message, and to determine said experience effect from said emotion. This allows experience effects to be produced without requiring the second person, who composed the digital message, to spend effort on it or use special software or commands to specify experience effects. Estimating an emotion of the second person may comprise estimating a mood of the second person.

Said at least one processor may be configured to estimate said emotion of said second person by determining whether certain words and/or emoticons are present in said digital message. This is a convenient way of estimating an emotion from the text of the digital message.

Said system may comprise said electronic device which can be used to produce said experience effect. By buffering the experience effects in the experience infrastructure, e.g. in the lighting infrastructure, the experience effects can even be produced when the first person does not carry a mobile device. For example, the experience infrastructure may be configured to use face recognition to detect whether the first person is within the certain range of an electronic device which can be used to produce the desired experience effect.

Said at least one processor may be configured to associate a release condition with said indicator of said first person and said experience effect in said memory, to determine whether said release condition is met, to cause said electronic device to produce said experience effect upon both said first person being determined to be within said certain range of said electronic device and said release condition being determined to be met and to cause said text to be reproduced on said text rendering device upon both said first person being determined to be within said certain range of said electronic device and said release condition being determined to be met. A release condition specifies the condition which needs to be met before the experience effect is allowed to be produced ("released"), e.g. a date, a time window or a switch being turned on. The use of a release condition allows the experience effects to be optimally targeted, especially when the second person is able to specify the release condition. For example, the second person may specify that the digital message should be presented on the birthday of the first person.

Said at least one processor may be configured to associate a further experience effect with said release condition and said indicator of said first person in said memory, said further experience effect being part of or derived from a further digital message, said further digital message being intended for said first person and comprising further text composed by a third person, to cause said electronic device to produce said experience effect and said further experience effect upon both said first person being determined to be within said certain range of said electronic device and said release condition being determined to be met and to cause said text and said further text to be reproduced on said text rendering device upon both said first person being determined to be within said certain range of said electronic device and said release condition being determined to be met. If two persons specify the same release condition for their digital message, e.g. because they both want to have their digital message presented on the birthday of the first person or because they want to have their digital message presented at the same party they are both attending, the experience effects derived from or part of these digital messages are preferably grouped and presented together.

Said at least one processor may be configured to cause reproduction of a request to said first person to go to an electronic device which can be used to produce said experience effect upon said release condition being determined to be met while said first person is determined not to be within said certain range of an electronic device which can be used to produce said experience effect. Since a release condition may expire (i.e. it may no longer be possible to meet at release condition at a certain point in time), it may be beneficial to direct the first person to an appropriate electronic device so that he does not miss the digital message with the experience effect(s). The text of the digital message may still be reproduced without the experience effect(s) after expiry of the release condition. For example, if the release condition is the birthday of the first person, the text of the digital message may still be presented to the first person without the experience effect(s) after the birthday of the first person.

Said at least one processor may be configured to cause said electronic device to produce said experience effect and a further experience effect in sequence, said further experience effect being part of or derived from a further digital message, said further digital message being intended for said first person and comprising further text composed by a third person, and the order of said sequence depending on at least one of: indicators of said second person and said third person, one or more properties of said digital message and said further digital message and one or more properties of said experience effect and said further experience effect. It may not be possible to present certain types of experience effects at the same time, e.g. light effects. In that case, it is beneficial to order the experience effects, e.g. according to one or more properties of the experience effects, of the digital messages themselves (e.g. their text) and/or of the composers of the digital messages.

In a second aspect of the invention, the method of orchestrating production of an experience effect comprises storing an indicator of a first person for which a digital message is intended and an experience effect in memory, said experience effect being part of or derived from said digital message and said digital message comprising text composed by a second person, determining whether said first person is within a certain range of an electronic device which can be used to produce said experience effect, causing said electronic device to produce said experience effect upon said first person being determined to be within said certain range of said electronic device, and causing said text to be reproduced on a text rendering device upon said first person being determined to be within said certain range of said electronic device. The method may be implemented in hardware and/or software.

The method may further comprise receiving said digital message, using computer-implemented analysis to estimate an emotion of said second person from said digital message, and determining said experience effect from said emotion.

The method may further comprise associating a release condition with said indicator of said first person and said experience effect in said memory and determining whether said release condition is met. Said electronic device may be caused to produce said experience effect upon both said first person being determined to be within said certain range of said electronic device and said release condition being determined to be met and said text may be caused to be reproduced upon both said first person being determined to be within said certain range of said electronic device and said release condition being determined to be met.

The method may further comprise associating a further experience effect with said release condition and said indicator of said first person in said memory, said further experience effect being part of or derived from a further digital message, said further digital message being intended for said first person and comprising further text composed by a third person. Said electronic device may be caused to produce said experience effect and said further experience effect upon both said first person being determined to be within said certain range of said electronic device and said release condition being determined to be met and said text and said further text may be caused to be reproduced upon both said first person being determined to be within said certain range of said electronic device and said release condition being determined to be met.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: storing an indicator of a first person for which a digital message is intended and an experience effect in memory, said experience effect being part of or derived from said digital message and said digital message comprising text composed by a second person, determining whether said first person is within a certain range of an electronic device which can be used to produce said experience effect, causing said electronic device to produce said experience effect upon said first person being determined to be within said certain range of said electronic device, and causing said text to be reproduced on a text rendering device upon said first person being determined to be within said certain range of said electronic device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
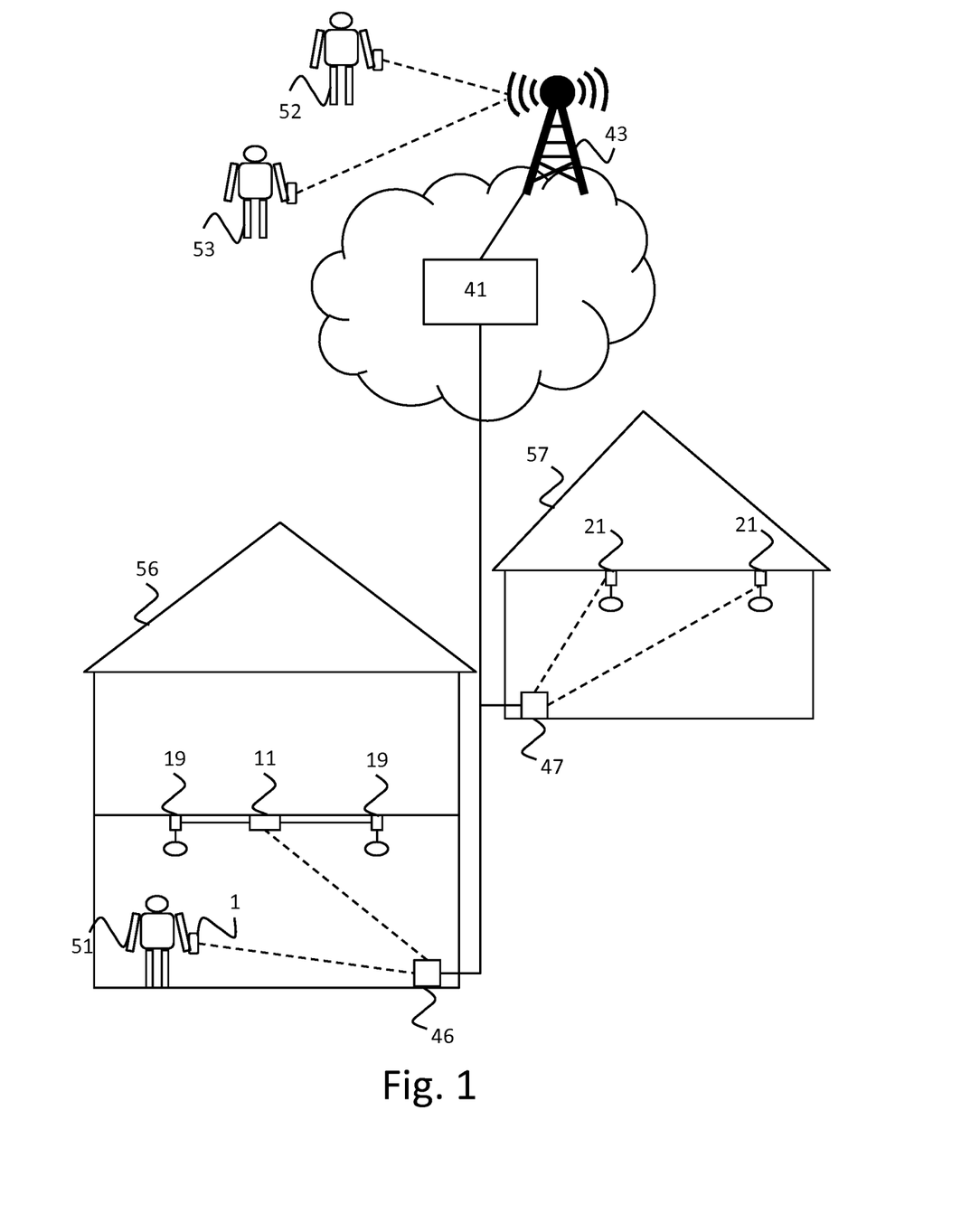
FIG. 1 shows a first example of embodiments of the system of the invention in operation.

FIG. 1 shows a first example of embodiments of the system of the invention in operation. The system may be embodied by a mobile device 1, a home control unit 11 or a luminaire 21, for example. The system may additionally comprise a server 41 which communicates with the mobile device 1, the home control unit 11 or the luminaire 21, for example.

The system comprises memory and at least one processor configured to store an indicator of a first person 51 for which a digital message is intended and an experience effect, e.g. a light effect, in the memory. The experience effect is part of or derived from the digital message. The digital message comprises text composed by a second person 52. The at least one processor is further configured to determine whether the first person 51 is within a certain range of an electronic device which can be used to produce the experience effect, e.g. a luminaire 19 or 21. The at least one processor is also configured to cause the electronic device, e.g. the luminaire 19 or 21, to produce the experience effect upon the first person 51 being determined to be within the certain range of the electronic device, e.g. the luminaire 19 or 21, and to cause the text to be reproduced upon the first person 51 being determined to be within the certain range of the electronic device, e.g. the luminaire 19 or 21. The system may cause the electronic device that produces the experience effect or another electronic device, e.g. the mobile device 1, to reproduce the text.

The experience effect may comprise, for example, an experience script (e.g. a light script). A light script may specify changes in color and intensity over time, for example. The use of light scripts in general is known from US 2014/0132390 A1, amongst others. In FIG. 1, the only devices that produce experience effects are luminaires. However, other electronic devices than luminaires may also be capable of producing experience effects, e.g. a coffee machine or an audio and/or video device. For example, the manipulation of blinds, the brewing of coffee and the releasing of fragrance may also be considered to be experience effects. Experience effects may also include animation, video, audio, music, and/or sound effects.

Figure 2:
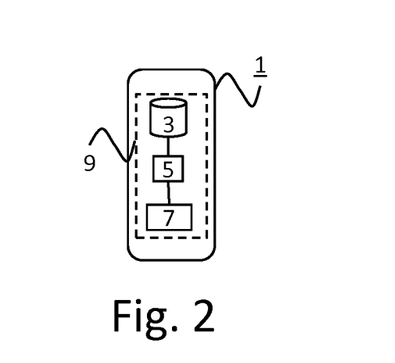
FIG. 2 is a block diagram of a first embodiment of the system.

The system may be embodied by the mobile device 1, as shown in FIG. 2, for example. The mobile device 1 comprises memory 3, a processor 5, a transceiver 7 and a display 9. The mobile device 1 may further comprise other components typical for a mobile device 1, e.g. a battery. Mobile device 1 may be a mobile phone, e.g. a smart phone, for example.

In the embodiment shown in FIG. 2, the mobile device 1 comprises one processor 5. In an alternative embodiment, the mobile device 1 comprises multiple processors. The processor 5 of the mobile device 1 may be a general-purpose processor, e.g. from ARM or Qualcomm, or an application-specific processor. The processor 5 of the mobile device 1 may run an iOS, Windows or Android operating system for example. The invention may be implemented using a computer program running on one or more processors. The memory 3 may comprise one or more memory units. The memory 3 may comprise solid state memory, for example. The transceiver 7 may use Wi-Fi, ZigBee or Bluetooth to communicate with access points 46 and 47, for example.

Figure 3:
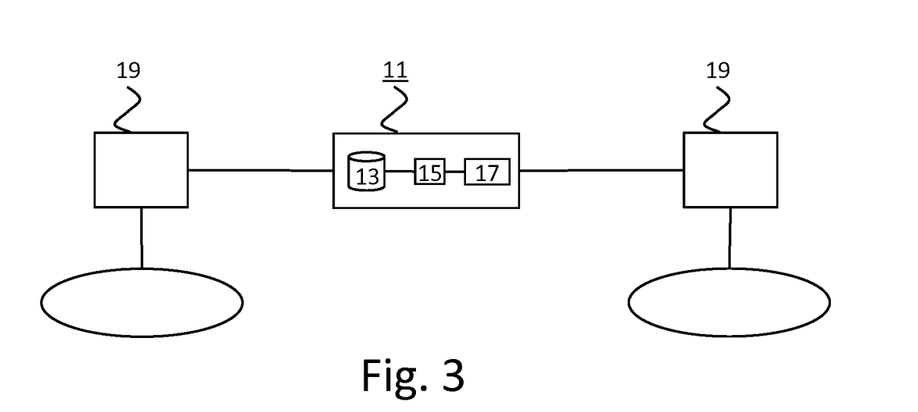
FIG. 3 is a block diagram of a second embodiment of the system.

Alternatively, the system may be embodied by the home control unit 11, as shown in FIG. 3, for example. The home control unit 11 comprises memory 13, a processor 15 and a transceiver 17. The home control unit 11 may further comprise other components typical for a home control unit, e.g. a power supply. The home control unit 11 may control luminaires 19, for example. The home control unit may control the color and brightness of the luminaires 19, for example. The home control unit 11 may control only luminaires or may control other electronic devices instead of or in addition to luminaires. The home control unit 11 may control the luminaires 19 via wire or wirelessly (e.g. using ZigBee, Bluetooth and/or Wi-Fi communication technologies).

In the embodiment shown in FIG. 3, the home control unit 11 comprises one processor 15. In an alternative embodiment, the home control unit 11 comprises multiple processors. The processor 15 of the home control unit 11 may be a general-purpose processor, e.g. from ARM, or an application-specific processor. The processor 15 of the home control unit 11 may run a Unix-based operating system for example. The invention may be implemented using a computer program running on one or more processors. The memory 13 may comprise one or more memory units. The memory 13 may comprise solid state memory, for example. The transceiver 17 may use Wi-Fi, ZigBee or Bluetooth to communicate with the access points 46 and 47, for example.

Figure 4:
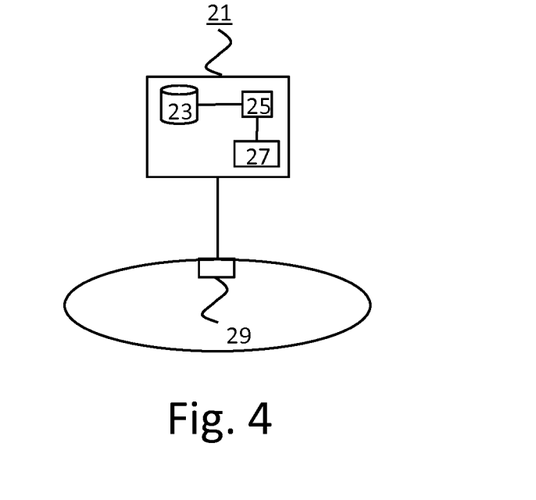
FIG. 4 is a block diagram of a third embodiment of the system.

Alternatively, the system may be embodied by the luminaire 21, as shown in FIG. 4, for example. The luminaire 21 comprises memory 23, a processor 25, a transceiver 27 and a light source 29, e.g. one or more LED chips. The luminaire 21 may further comprise other components typical for a luminaire, e.g. a power supply.

In the embodiment shown in FIG. 4, the luminaire 21 comprises one processor 25. In an alternative embodiment, the luminaire 21 comprises multiple processors. The processor 25 of the luminaire 21 may be a general-purpose processor, e.g. from ARM, or an application-specific processor. The processor 25 of the luminaire 21 may run a Unix-based operating system for example. The invention may be implemented using a computer program running on one or more processors. The memory 23 may comprise one or more memory units. The memory 23 may comprise solid state memory, for example. The transceiver 27 may use Wi-Fi, ZigBee or Bluetooth to communicate with the access points 46 and 47, for example.

The second person 52 may compose the digital message using his mobile device, e.g. by using an app on his mobile device. This app may be retrieved, for example, from an App store, e.g. Apple's App Store or Google's Play Store. The app may be, for example, an e-mail app (e.g. Gmail or Outlook app), a chat app (e.g. WhatsApp or Line app) or a social media app (e.g. Facebook, Twitter or Linked-In app). The app communicates with a server 41 on the Internet. This app may be the same app as used by the first person 51 on mobile device 1. The mobile device of the second person 52 is connected to the Internet via base station 43 of a mobile communication network (e.g. an UMTS, CDMA2000 or LTE network).

Access points 46 and 47 of buildings 56 and 57 are also connected to the Internet, e.g. via a fiber, ADSL or cable network. The mobile device 1 used by the first person 51 and the home control unit 11 are connected to access point 46, e.g. using Wi-Fi technology. Luminaires 21 are connected to access point 47, e.g. using Wi-Fi technology.

The second person 52 may insert the experience effect into the digital message when composing the digital message. Alternatively, the server 41, the mobile device 1, the home control 11 or the luminaire 21 may derive the experience effect from the digital message, e.g. by estimating an emotion of the second person 52 from the digital message and determining the experience effect from this emotion. The processor 5, 15 or 25 may be configured, for example, to estimate the emotion of the second person 52 by determining whether certain words and/or emoticons are present in the digital message.

If the system is embodied by the mobile device 1, the processor 5 may monitor whether the first person 51 (who is using the mobile device 1) is within a certain range of an electronic device which can be used to produce the experience effect. As a first example, the processor 5 may use the transceiver 7 to receive an RF transmission from an electronic device and may determine the mobile device 1 (and therefore the first person 51) to be within the certain range of the electronic device if the received signal strength exceeds a predetermined threshold. As a second example, the processor 5 may use a camera of the mobile device 1 to capture an image of the environment of the mobile device 1 and may determine the mobile device 1 to be within a certain range of an electronic device if the electronic device is recognized in the image using image recognition techniques. As a third example, the processor 5 may use a camera or light sensor to receive light transmissions comprising data, i.e. transmitted using Visible Light Communication (VLC), and may determine the mobile device 1 to be within the certain range of the electronic device if the processor 5 receives a light transmission from the electronic device.

Likely, not all electronic devices that are within the certain range of the first person 51 can produce a desired experience effect. An electronic device may not be capable of producing a desired experience effect (e.g. a coffee machine may not be able to produce a light effect) or it may not be willing (e.g. due to access restrictions or due to it being used for another application) to produce a desired experience effect. As a first option, the mobile device 1 may contact the luminaires 19 or the home control unit 11 to ask them whether the luminaires 19 are capable of and willing to produce a desired experience effect. The luminaires 19 or the home control unit 11 then respond to this question and may indicate in their response at what moment the desired experience effect can be produced.

As a second option, the luminaires 19 or the home control unit 11 may first transmit, e.g. broadcast, a message indicating the capabilities of the luminaires 19 and the mobile device 1 may use this information to contact only relevant ones of the luminaires 19 and the home control unit 11. The transmitted message may also indicate under which conditions (e.g. at what moment and for whom) the luminaires 19 are willing to produce experience effects.

After the mobile device 1 has determined that the first person 51 is within a certain range of a luminaire 19 which can be used to produce the experience effect, the mobile device 1 instructs this luminaire 19 or the home control unit 11 to produce the experience effect on this luminaire 19. The mobile device 1 then reproduces the text of the digital message on its display 9. When the electronic device producing the experience effect would be capable of displaying a message, e.g. would be a TV, the mobile device 1 might instruct the electronic device to reproduce the text of the digital message as well. Alternatively, if an electronic device other than the electronic device producing the experience effect and the mobile device 1 is within the certain range of the first person 51 (and can reproduce the text), the mobile device 1 may instruct this other electronic device to reproduce the text. The text of the digital message may alternatively or additionally be reproduced on a speaker via text-to-speech.

If the system is embodied by the home control unit 11, the processor 15 may monitor whether the first person 51 is within a certain range of an electronic device which can be used to produce the experience effect, e.g. one of the luminaires 19. The processor 15 may be configured to determine that the first person 51 is within a certain range of an electronic device when the first person 51 is within a certain range of the home control unit 11 and the electronic device is located near the home control unit 11. Before the processor 15 of the home control unit 11 starts monitoring, the server 41 or an app running on the mobile device 1 first determines to which electronic devices an instruction or request to perform this monitoring needs to be sent and sends this instruction to these electronic devices (in this example to the home control unit 11 and the luminaires 21). Sending the instruction (which may be in the form of a request) to an electronic device may be as simple as forwarding the digital message (or part thereof) to the electronic device. After an electronic device has produced the experience effect, it may inform the server 41 or the app running on the mobile device 1. The server 41 or the app running on the mobile device may then inform the other electronic devices that the previously sent instruction or request is withdrawn.

The second person 52 who composed the digital message may be able to select which electronic devices should be instructed or may be able to select locations at which the electronic devices should be instructed. The first person 51 may have associated certain experience devices and/or certain locations with his (e.g. social media) account. The second person 52 may be able to choose from these experience devices and/or locations. A mapping between locations and one or more devices at these locations (e.g. a gateway assigned to a location) may be used by the server 41 or the app running on the mobile device 1 to determine which electronic devices to send the instruction or request to for the selected locations.

If the second person 52 chooses one or more locations, all known/reachable devices at these locations may be instructed (either directly or via a gateway) to monitor whether the first person 51 is within a certain range of an electronic device which can be used to produce the experience effect. Alternatively, the second person 52 may not need to select an electronic device or a location, but all of the devices associated with the account of the first person 51 or at a location associated with the account of the first person 51 may be instructed to monitor whether the first person 51 is within a certain range of an electronic device which can be used to produce the experience effect. Alternatively, only the electronic devices that are capable of producing the desired experience effect are instructed to monitor whether the first person 51 is within a certain range of an electronic device which can be used to produce the experience effect.

If the first person 51 has associated certain experience devices with his account, the second person may be able to see the capabilities of these experience devices and specify experience effects taking into account this information. The capabilities of the experience devices (e.g. which colors a lamp supports and the pixel resolution of a lamp) may be associated with the account of the first person 51 as well or may be obtained from the experience devices upon request.

The first person 51 may even allow other persons to configure his experience device(s). This opens the option that a certain light control (e.g. one of the pre-set buttons) is configured to give a special effect, for example. This can be, for example, at a birthday only, but also for a longer period. For example, when a partner is traveling for a month, a light script may be played during that time whenever that button is used. The light script may vary over time depending on different kinds of information e.g. time left until return, or it may be rewritten every night. It may be a 'lullaby' that a small child receives every night before it goes to sleep from the partner who is traveling.

The second person 52 may also be able to specify locations that are not associated with the account of the first person 51. The second person 52 may be able to use an app on his mobile device to specify GPS coordinates, for example. Additionally or alternatively, the first person 51 may have released some information on locations that he is going to visit (e.g. people that he is going to meet at his home, their home or a pub) and the second person 52 may be able to select from these locations. Calendar information or other information on whereabouts such as checking in at a location or events via social media sites (Foursquare, Facebook, etc.) may be used as well. Additionally or alternatively, information about which location(s) the first person 51 is going to visit may be derived from an invite of a friend to a group of friends (common to the first person) to celebrate or surprise the first person 51 with a stream of messages and experience effects, e.g. light effects.

The second person 52 may also be able to specify electronic devices that are not associated with the account of the first person 51. For example, the second person 52 may be able to select (and optionally reserve) an electronic device in a public environment, e.g. lamp in a pub next to a table that he is reserving at the same time or a light pole near a bench in the park.

If the system is embodied by the mobile device 1, the second person 52 may still be able to specify locations and/or electronic devices as described above, but then preferably as part of a release condition. The second person 52 may further be able to indicate whether he wants to receive a notification when the experience effect has been produced.

The processor 15 of the home control unit 11 may use its transceiver 17 or a camera to detect that the first person 51 is within a certain range of the home control unit 11 or one or more of the luminaires 19 connected to the home control unit 11. As a first example, the processor 15 may use the transceiver 17 or a transceiver in one or both of the luminaires 19 to receive an RF transmission from the mobile device 1 and may determine the mobile device 1 (and therefore the first person 51) to be within the certain range of the home control unit 11 or one or both of the luminaires 19 if the received signal strength exceeds a predetermined threshold.

As a second example, the processor 15 may use a camera of the home control unit 1 or of one or both of the luminaires 19 to capture an image of its environment and may determine the first person 51 to be within the certain range of the home control unit 11 or of one or both of the luminaires 19 when the processor 15 recognizes the face of the first person 51. In this second example, the processor 15 may use the transceiver 17 to receive characteristics, e.g. from the server 41, of the face of the first person 51 to allow face recognition to be performed.

After the processor 15 of the home control unit 11 has determined that the first person 51 is with a certain range of the home control unit 11 or one or more of the luminaires 19 connected to the home control unit 11, the processor 15 of the home control unit 11 determines whether it is capable of and willing to produce the desired experience effect. If the processor 15 of the home control unit 11 determines that it is not capable of or not willing to produce the desired experience effect, it will perform no further action. Since luminaires 19 are not capable of reproducing text, the processor 15 of the home control unit 11 instructs the mobile device 1 to reproduce the text of the digital message. The processor 15 might first check whether the mobile device 1 can reproduce the text of the digital message, although this is preferably not needed. If an electronic device capable of reproducing text would be connected to the home control unit 11 (e.g. as part of the home network), the processor 15 might instruct this electronic device to reproduce the text. This electronic device might be the same device as the electronic device that produces the experience effect.

If the system is embodied by the luminaire 21, the processor 25 may monitor whether the first person 51 is within a certain range of the luminaire 21. The luminaire 21 and its processor 25 are configured similarly as the home control unit 11 and its processor 15, but unlike the home control unit 11, the luminaire 21 only needs to control itself.

Figure 5:
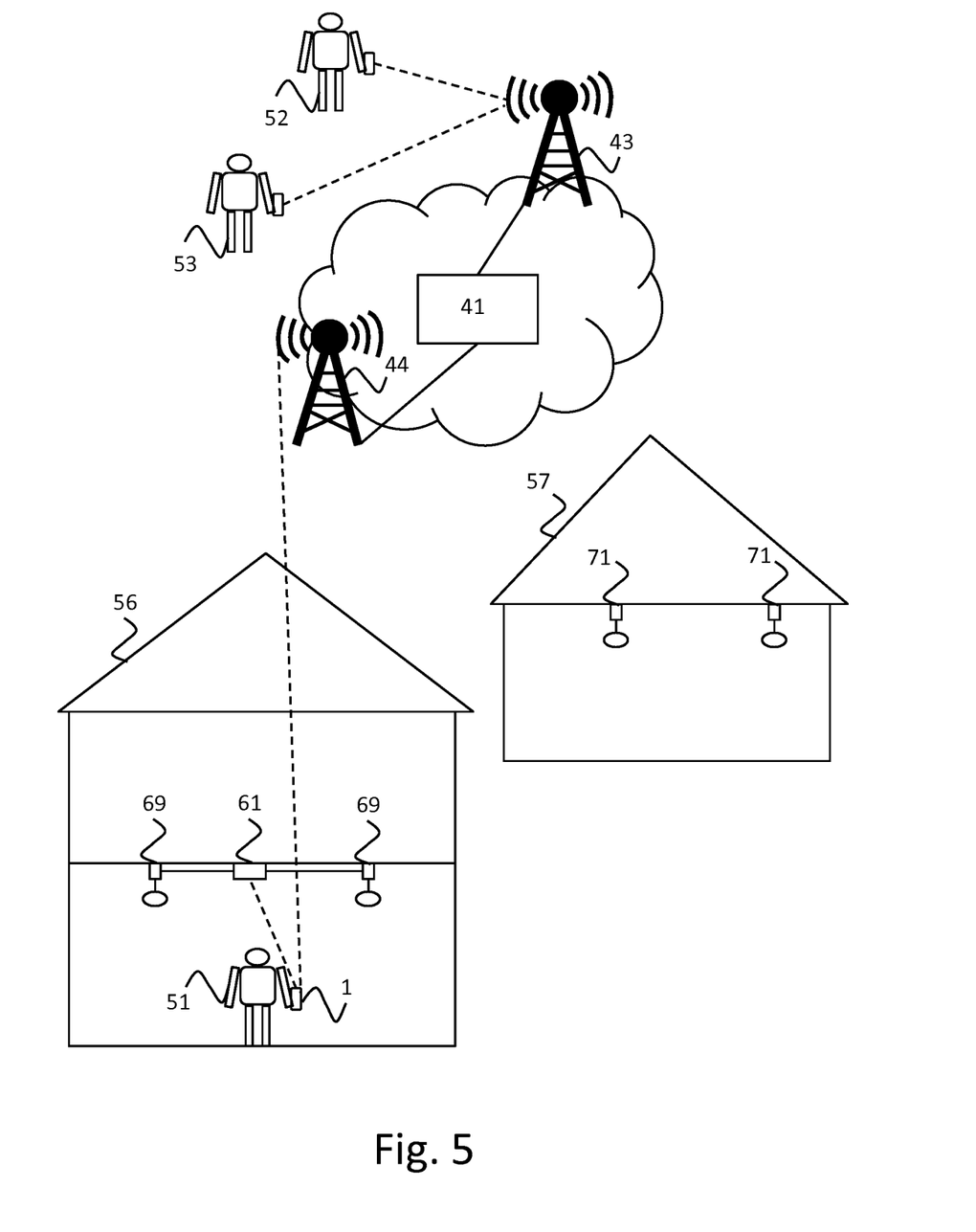
FIG. 5 shows a second example of the first embodiment of FIG. 2 in operation.

If the system is embodied by the mobile device 1, the home control unit and the luminaires do not need to be connected to the Internet, see FIG. 5. Home control unit 61, which is connected to luminaires 69, and luminaires 71 are capable of communicating with the mobile device 1 via wireless local area networks or personal area networks, e.g. using ZigBee, Bluetooth or Wi-Fi technology. Home control unit 61 and luminaires 69 and 71 cannot be configured or controlled from the Internet, but the mobile device 1 is able to check directly with the home control unit 61 and the luminaires 69 whether the luminaires 69 and 71 can produce the desired experience effect and instruct the home control unit 61 or the luminaires 71 to produce the desired experience effect. In the example of FIG. 5, the mobile device 1 is not connected to the Internet via an (W)LAN access point, but via base station 44 of a mobile communication network. The transceiver 9 may use GPRS, EDGE, UMTS, LTE and/or 5G technologies to communicate with a base station 44, for example.

In an embodiment, the processor 5, 15 or 25 is configured to associate a release condition with the indicator of the first person 51 and the experience effect in the memory 3, 13 or 23, to determine whether the release condition is met, to cause the electronic device, e.g. the luminaire 19, 21, 69 or 71, to produce the experience effect upon both the first person 51 being determined to be within the certain range of the electronic device, e.g. the luminaire 19, 21, 69 or 71, and the release condition being determined to be met and to cause the text to be reproduced upon both the first person 51 being determined to be within the certain range of the electronic device, e.g. the luminaire 19, 21, 69 or 71, and the release condition being determined to be met.

The release condition may comprise, for example, a date (e.g. a birthday), a time window on one day or spanning multiple days, a time of day (e.g. between 9 am and 11 am), lighting conditions (e.g. a measured lux of less than 10), presence of other people (e.g. people in general or specific persons), location (e.g. GPS coordinates, home, work, hotel room, pub, bedroom, bathroom, living room, etc.) and/or a switch (e.g. a light switch) being switched on or off. A time window may be specified by only specifying a start date or by only specifying an expiration date, for example.

The release condition may be specified by the second person 52, for example. The second person 52 may be able to browse a list of events (e.g. "birthday", "TV is switched on", "arriving home") and select one or more of these events as a release condition. If the release condition comprises a start date and/or start time, the digital message and/or the experience effect, e.g. a light script, may be queued on the server 41 until such start date and/or start time have been reached and forwarded to the mobile device 1, home control unit 11 and/or luminaires 21 at that time. The second person 52 may be further able to indicate whether he wants to receive a notification when the experience effect has been produced.

The second person 52 may also be able to indicate which other persons or groups of persons are allowed to see the release condition specified by him and optionally associate their further digital message with the same release condition. For example, the second person 52 may not want the first person 51 to see the release condition specified by him (e.g. the fact that the birthday of the first person 51 has been defined as a release condition).

The processor 5, 15 or 25 may be configured to associate a further experience effect with the release condition and the indicator of the first person 51 in the memory 3, 13 or 23. The further experience effect may be part of or derived from a further digital message. The further digital message may be intended for the first person 51 and may comprise further text composed by a third person 53. The processor 5, 15 or 25 may be further configured to cause the electronic device, the luminaire 19, 21, 69 or 71, to produce the experience effect and the further experience effect upon both the first person 51 being determined to be within the certain range of the electronic device, e.g. the luminaire 19, 21, 69 or 71, and the release condition being determined to be met and to cause the text and the further text to be reproduced upon both the first person 51 being determined to be within the certain range of the electronic device, e.g. the luminaire 19, 21, 69 or 71, and the release condition being determined to be met.

The further experience effect may be associated with the release condition and the indicator of the first person 51 even if the second person 52 did not allow the third person 53 to see the release condition associated with the digital message composed by the second person 52. The processor 15 or 25 may be configured to associate the experience effect and the further experience effect with the same release condition if the same release condition was specified for both the digital message and the further digital message.

The processor 5 may be configured to cause reproduction of a request to the first person 51 to go to an electronic device which can be used to produce the experience effect, e.g. the luminaire 19, 21, 69 or 71, upon the release condition being determined to be met while the first person 51 is determined not to be within the certain range of an electronic device which can be used to produce the experience effect, e.g. the luminaire 19, 21, 69 or 71. The request may be reproduced on the display 9 of the mobile device 1, for example. Alternatively, the request may be reproduced on a speaker via text-to-speech. The request may specify a specific electronic device detected in the vicinity of the first person 51 and/or the capabilities/type of the electronic device to which the first person 51 should go. The release condition may comprise the birthday of the first person 51 and the request to the first person 51 may comprise the text "Please go to your living room in order to receive a message", for example.

The processor 5, 15 or 25 may be configured to cause the electronic device, e.g. the luminaire 19, 21, 69 or 71, produce the experience effect and the further experience effect in sequence. The order of the sequence may depend on at least one of: indicators of the second person 52 and the third person 53, one or more properties of the digital message and the further digital message and one or more properties of the experience effect and the further experience effect. The one or more properties of the experience effects may comprise, for example, color variation and/or dynamic intensity. For example, less dynamic light effects may be produced first, resulting in a climax at the end of the sequence.

The one or more properties of the messages may comprise, for example, the size of the messages or the presence of certain words or emoticons in the text. Messages with a shorter text may be prioritized, for example. Messages with similar text and/or emoticons may be grouped together and/or may be prioritized, for example. The one or more properties of the person may be their gender, for example. Transient light effects may be inserted in the sequence between the different light effects derived from or extracted from the digital messages.

Experience effects may be reproduced in sequence when multiple experience effects are associated with the same release condition, but also when multiple experience effects are not associated with any release condition. Experience effects may be reproduced in sequence when these multiple experience effects are related to the same person, but also when these multiple experience effects are related to different persons, e.g. when they travel together.

An example of experience effects stored/buffered in a part of memory 5 of mobile device 1 that has been associated with a Facebook user name "DoloresFlood57" is shown in Table 1 below:

TABLE 1

| # | Release condition | Experience effect |
|---|---|---|
| 1 | Date = 13 Sep. 2017 | Light effect "beating heart" |
| 2 | Date = 13 Sep. 2017 | Light effect "explosion of colors" |

An example of experience effects stored/buffered in memory 15 of home control unit 11 or in memory 25 of luminaire 21 is shown in Table 2 below:

TABLE 2

| # | Person | Release condition | Experience effect |
|---|---|---|---|
| 1 | Dolores Flood | Date = 13 Sep. 2017 | Light effect "beating heart" |
| 2 | Dolores Flood | Date = 13 Sep. 2017 | Light effect "explosion of colors" |
| 3 | David Barrett | None | Fragrance "lavender" |
| 4 | David Barrett | None | Light effect "rising sun" |

In Table 2, the experience effects are identified by names recognized by the electronic devices producing the experience effects. The experience effects may also be stored as scripts specified in a script language. Facial recognition characteristics may be obtained and/or stored (e.g. in memory 3 or 13) in relation to the persons listed in Table 2 in order to recognize these persons within the certain range of the home control unit 11 or the luminaire 21.

An example of a digital message from which experience effect #2 of Tables 1 and 2 has been derived is shown in Table 3 below.

TABLE 3

| # | Author | Contents |
|---|--------|----------|
| 2 | John Rayne | Congratulations with your birthday! I hope you have a great day. John. |

Figure 6:
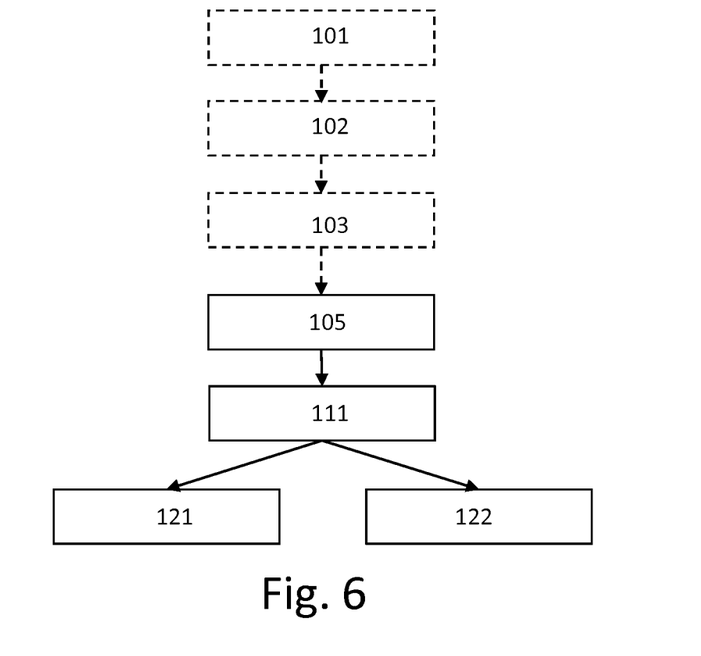
FIG. 6 is a flow diagram of a first embodiment of the method of the invention.

In a first embodiment of the method of orchestrating production of an experience effect, the method comprises seven steps, see FIG. 6. A step 101 comprises receiving a digital message intended for a first person. The digital message comprises text composed by a second person. A step 102 comprises using computer-implemented analysis to estimate an emotion of the second person from the digital message. A step 103 comprises determining the experience effect from the emotion. For example, step 102 may comprise detecting an angry message and step 103 may comprise determining an explosion effect to accompany this angry message. As another example, step 102 may comprise detecting a happy message and step 103 may comprise determining a rainbow light effect or heartbeat light animation to accompany this happy message.

The emotion (which may be a mood if not related to a specific incident) may be estimated by analyzing the words and/or emoticons in the digital message. Step 102 may comprise comparing the text of the digital message with lists of words and/or emoticons associated with certain emotions. The context of these words may also be taken into account. For example, if the text includes the word "happy" without the word "not" preceding it, the digital message may be classified as a happy message and if the text includes the word "happy" with the word "not" preceding it (and optionally, without a happy smiley face succeeding it), the digital message may be classified as an angry message. Another list/database associating these certain emotions to experiences effects may then be used in step 103.

In another embodiment, computer-implemented analysis may be used on an image in the digital message to determine the experience effect. For example, the digital message may comprise an image of a sunset at the beach and a processor may derive a color palette from the image, detect the sunset and sea in the image and generate a light script based on the results of the analysis.

A step 105 comprises storing an indicator of the first person and an experience effect in memory. The experience effect is part of or derived from the digital message. Step 105 may comprise storing the digital message (or part thereof) in the memory. The indicator of the first person may comprise the e-mail address, phone number or the user name of the first person, for example. Step 105 may comprise storing the experience effect in a part of the memory that is associated with the first person, for example. A step 111 comprises determining whether the first person is within a certain range of an electronic device which can be used to produce the experience effect. If step 111 is performed by a luminaire or home control unit, step 111 may involve using the stored indicator of the first person, which may comprise or may be used to obtain facial characteristics or an ID of a mobile device of the first person, for example.

A step 121 comprises causing the electronic device to produce the experience effect upon the first person being determined to be within the certain range of the electronic device. A step 122 comprises causing the text to be reproduced upon the first person being determined to be within the certain range of the electronic device. The stored association between the first person and the experience effect allows the text of the digital message and the experience effect to be produced at the same time. Steps 121 and 122 are shown being performed in parallel, because the experience effect is produced at the same time as the text is being reproduced.

Figure 7:
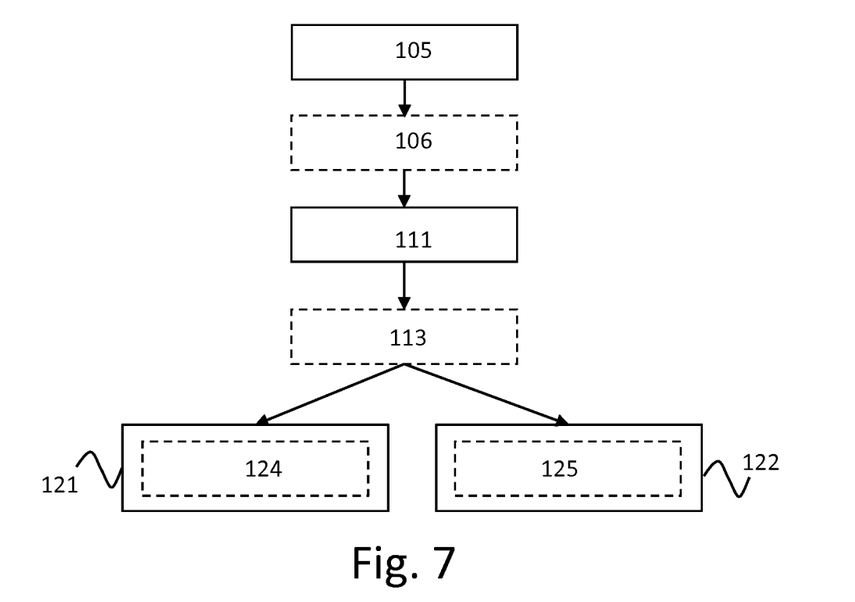
FIG. 7 is a flow diagram of a second embodiment of the method of the invention.

In a second embodiment, see FIG. 7, the method comprises steps 106, 113, 124 and 125 instead of or in addition to steps 101 to 103 of FIG. 6. Step 106 comprises associating a release condition with the indicator of the first person and the experience effect in the memory. Step 113 comprises determining whether the release condition is met. Step 124, an embodiment of step 121, comprises causing the electronic device to produce the experience effect upon both the first person being determined to be within the certain range of the electronic device and the release condition being determined to be met. Step 125, an embodiment of step 122, comprises causing the text to be reproduced upon both the first person being determined to be within the certain range of the electronic device and the release condition being determined to be met.

Figure 8:
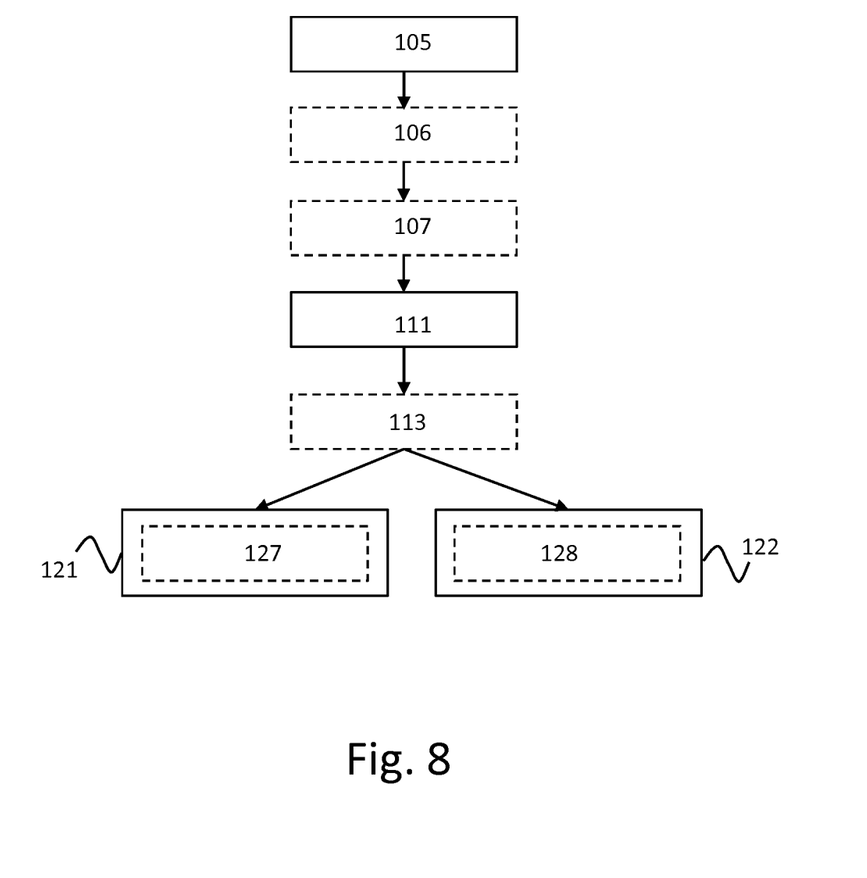
FIG. 8 is a flow diagram of a third embodiment of the method of the invention.

In a third embodiment, see FIG. 8, the method comprises an additional step 107 compared to the second embodiment of FIG. 7, and steps 121 and 122 are embodied by steps 127 and 128, respectively, instead of by steps 124 and 125 of FIG. 7. Step 107 is performed between steps 106 and 111. Step 107 comprises associating a further experience effect with the release condition and the indicator of the first person in the memory. The further experience effect is part of or derived from a further digital message. The further digital message is intended for the first person and comprises further text composed by a third person.

Step 127 comprises causing the electronic device to produce the experience effect and the further experience effect upon both the first person being determined to be within the certain range of the electronic device and the release condition being determined to be met. Step 128 comprises causing the text and the further text to be reproduced upon both the first person being determined to be within the certain range of the electronic device and the release condition being determined to be met.

Figure 9:
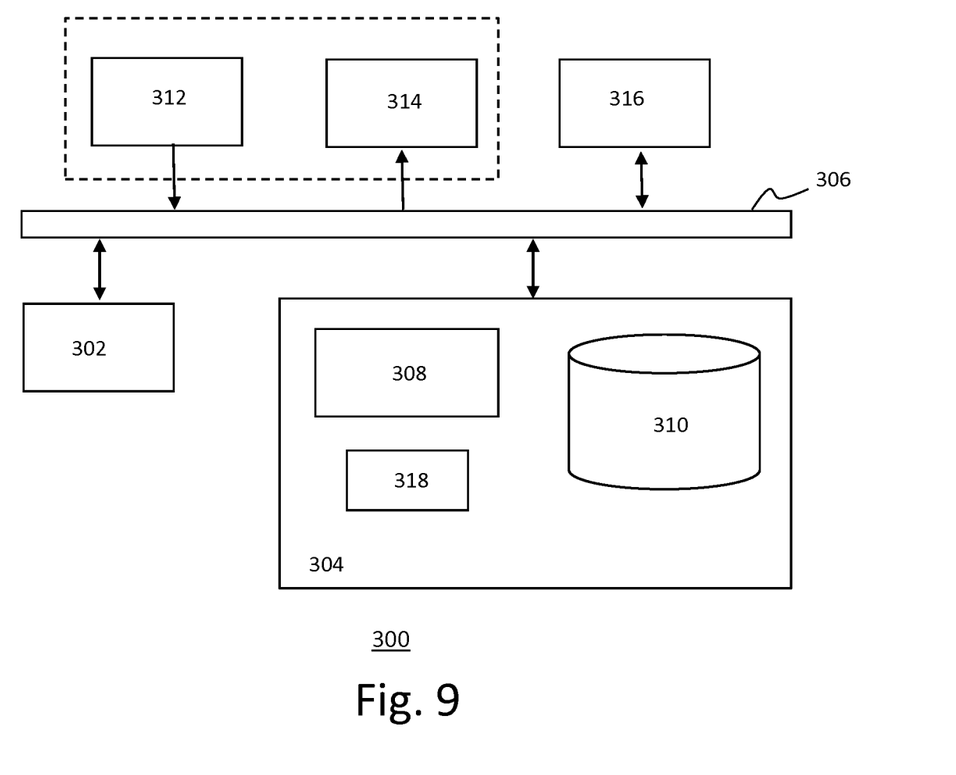
FIG. 9 is a block diagram of an exemplary data processing system for performing the method of the invention.

FIG. 9 depicts a block diagram illustrating an exemplary data processing system that may perform the method as described with reference to FIGS. 6 to 8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for enhancing reproduction of a digital message, comprising:

memory; and at least one processor configured to store an indicator of a first person for which the digital message is intended and a light effect in said memory, said light effect being part of or derived from said digital message and said digital message comprising text composed by a second person, to determine whether said first person is within a certain range of a luminaire which can be used to produce said light effect, to cause said luminaire to produce said light effect upon said first person being determined to be within said certain range of said luminaire, and to cause said text to be reproduced on a text rendering device upon said first person being determined to be within said certain range of said luminaire, wherein said at least one processor is further configured to:

associate a release condition with said indicator and said light effect in said memory, to determine whether said release condition is met, to cause said luminaire to produce said light effect upon both said first person being determined to be within said certain range of said luminaire and said release condition being determined to be met, and to cause said text to be reproduced on said text rendering device upon both said first person being determined to be within said certain range of said luminaire and said release condition being determined to be met, and cause reproduction of a request to said first person to go to a luminaire which can be used to produce said light effect upon said release condition being determined to be met while said first person is determined not to be within said certain range of a luminaire which can be used to produce said light effect.

2. A system as claimed in claim 1, wherein said at least one processor is configured to receive said digital message, to estimate an emotion of said second person from said digital message, and to determine said light effect from said emotion.

3. A system as claimed in claim 2, wherein said at least one processor is configured to estimate said emotion of said second person by determining whether certain words and/or emoticons are present in said digital message.

4. A system as claimed in claim 1 comprising said luminaire which can be used to produce said light effect.

5. A system as claimed in claim 1, wherein said at least one processor is configured to associate a further light effect with said release condition and said indicator of said first person in said memory, said further light effect being part of or derived from a further digital message, said further digital message being intended for said first person and comprising further text composed by a third person, to cause said luminaire to produce said light effect and said further light effect upon both said first person being determined to be within said certain range of said luminaire and said release condition being determined to be met and to cause said text and said further text to be reproduced on said text rendering device upon both said first person being determined to be within said certain range of said luminaire and said release condition being determined to be met.

6. A system as claimed in claim 1, wherein said at least one processor is configured to cause said luminaire to produce said light effect and a further light effect in sequence, said further light effect being part of or derived from a further digital message, said further digital message being intended for said first person and comprising further text composed by a third person, and the order of said sequence depending on at least one of: indicators of said second person and said third person, one or more properties of said digital message and said further digital message and one or more properties of said light effect and said further light effect.

7. A method of enhancing reproduction of a digital message, comprising:
storing an indicator of a first person for which a digital message is intended and an light effect in memory, said light effect being part of or derived from said digital message and said digital message comprising text composed by a second person;
determining whether said first person is within a certain range of a luminaire which can be used to produce said light effect;
causing said luminaire to produce said light effect upon said first person being determined to be within said certain range of said luminaire;
causing said text to be reproduced on a text rendering device upon said first person being determined to be within said certain range of said luminaire;
associating a release condition with said indicator of said first person and said light effect in said memory;
determining whether said release condition is met, wherein said luminaire is caused to produce said light effect upon both said first person being determined to be within said certain range of said luminaire and said release condition being determined to be met and said text is caused to be reproduced upon both said first person being determined to be within said certain range of said luminaire and said release condition being determined to be met; and
causing reproduction of a request to said first person to go to a luminaire which can be used to produce said light effect upon said release condition being determined to be met while said first person is determined not to be within said certain range of a luminaire which can be used to produce said light effect.

8. A method as claimed in claim 7, further comprising:
receiving said digital message;
using computer-implemented analysis to estimate an emotion of said second person from said digital message; and
determining said light effect from said emotion.

9. A method as claimed in claim 7, further comprising:
associating a further light effect with said release condition and said indicator of said first person in said memory, said further light effect being part of or derived from a further digital message, said further digital message being intended for said first person and comprising further text composed by a third person, wherein said luminaire is caused to produce said light effect and said further light effect upon both said first person being determined to be within said certain range of said luminaire and said release condition being determined to be met and said text and said further text are caused to be reproduced upon both said first person being determined to be within said certain range of said luminaire and said release condition being determined to be met.

10. A computer program, embodied in a non-transitory computer readable medium, and comprising at least one software code portion which, when run on one or more computer processors, is configured to perform the method of claim 7.

* * * * *